United States Patent [19]

Vandenberk

[11] Patent Number: 4,990,247
[45] Date of Patent: Feb. 5, 1991

[54] RELIEF VALVE FOR LIQUID FILTER

[75] Inventor: Theodorus A. Vandenberk, Stratford, Canada

[73] Assignee: Allied-Signal Inc., Morristown, N.J.

[21] Appl. No.: 404,477

[22] Filed: Sep. 8, 1989

[51] Int. Cl.⁵ .............................................. B01D 27/10
[52] U.S. Cl. .................... 210/130; 210/429; 210/440; 210/DIG. 17; 137/541; 137/543.17
[58] Field of Search .............. 137/540, 540.11, 543.17, 137/541; 210/130, 136, 429–431, 440, DIG. 17

[56] References Cited

U.S. PATENT DOCUMENTS

| | | | |
|---|---|---|---|
| 2,702,638 | 2/1955 | Nugent | 210/130 |
| 3,156,259 | 11/1964 | Havelka et al. | 210/130 |
| 3,807,561 | 4/1974 | Cullis | 210/130 |
| 4,028,243 | 6/1977 | Offer et al. | 210/130 |

FOREIGN PATENT DOCUMENTS

| | | | |
|---|---|---|---|
| 2106510 | 5/1972 | France . | |
| 1133860 | 11/1968 | United Kingdom | 210/130 |
| 1439866 | 6/1976 | United Kingdom | 210/130 |
| 1592613 | 7/1978 | United Kingdom . | |

Primary Examiner—W. Gary Jones
Assistant Examiner—Matthew Savage
Attorney, Agent, or Firm—Ken C. Decker; William N. Antonis

[57] ABSTRACT

A liquid filter as disclosed which includes a housing in which a filtering media is disposed. A relief valve permits the liquid filtrate to bypass the media when the pressure differential across the media exceeds a predetermined level. The relief valve includes a valve member consisting of a valve disc from which four legs extend. The valve closure spring engages the legs to maintain the valve closed until the pressure differential attains a predetermined level. The legs are designed so that only two of the legs engage the spring during normal operation of the valve. Accordingly, the other two legs remain unstressed by the valve spring, but can engage the edge of the valve aperture in case of failure of one or both of the other legs to prevent the valve member from falling into the liquid filtrate, thus blocking the flow of liquid filtrate to the engine, causing catastrophic failure of the engine.

6 Claims, 1 Drawing Sheet

U.S. Patent  Feb. 5, 1991  Sheet 1 of 1  4,990,247
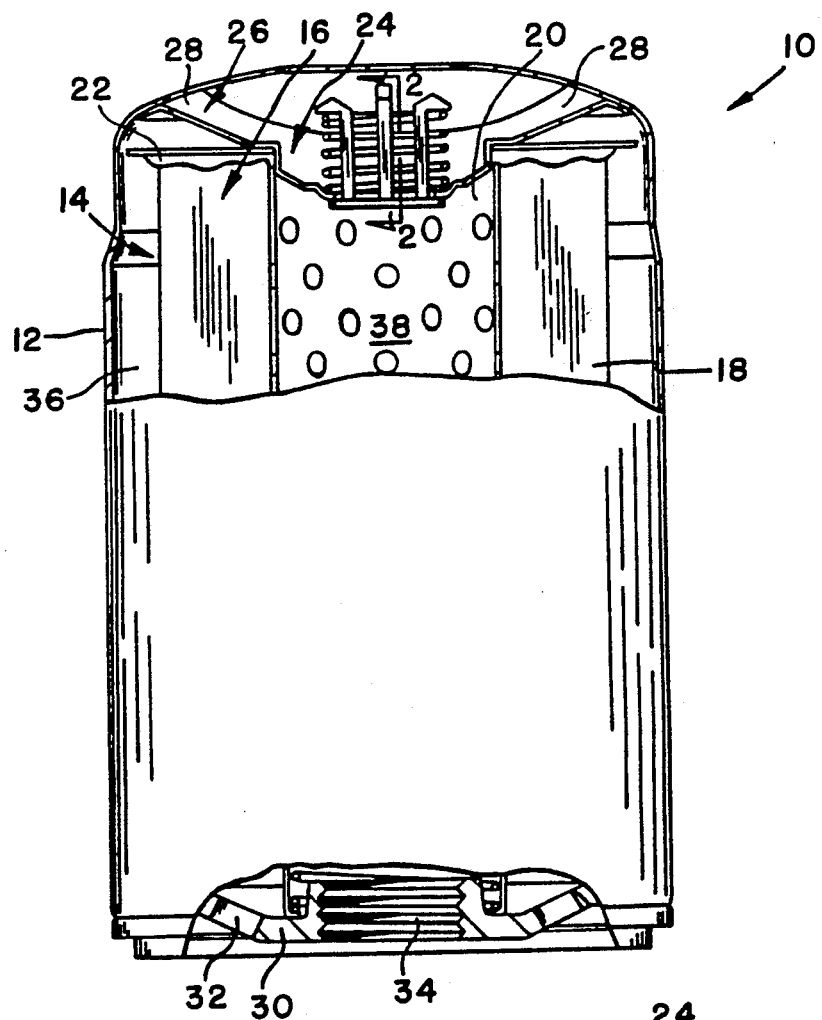
FIG. 1
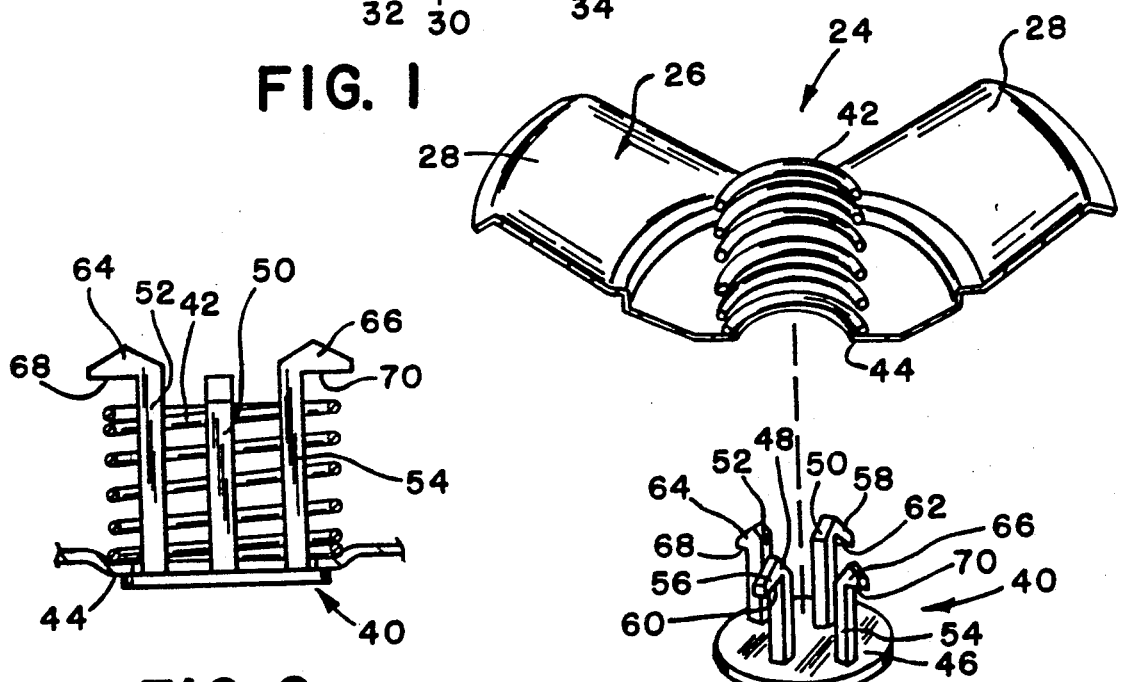
FIG. 2
FIG. 3

RELIEF VALVE FOR LIQUID FILTER

This invention relates to a liquid

Liquid filters are used on automotive internal combustion engines to filter the lubricating oil. Such filters normally are of the so-called "spin-on" type, in which a filtering media is sealed into a metal can which is discarded and replaced at regular intervals. The filtering media consists of filter paper pleated and formed into a circumferentially extending array of radially tapering pleats. The media is installed in the can and cooperates with the wall thereof to define an inlet chamber. The media circumscribes a centertube, which defines an outlet chamber. The inlet and outlet chambers are communicated with the engine lubricating system through openings in an end of the filter can. Since a plugged filter media starves an engine of its lubricating oil, it is necessary to provide a bypass valve which opens to permit the lubricating oil to bypass the media when the pressure differential between the inlet and outlet chambers exceeds a predetermined level. One such relief valve is disclosed in U.S. Pat. No. 3,807,561, and consists of a spring-loaded check valve closing the end of the centertube opposite the end which is communicated to the outlet opening.

Of course, if a small part of the filter breaks, the broken piece can immediately enter the engine lubricating system, thus blocking flow of lubricating oil to the engine, causing severe damage to the engine upon which the filter used. Prior art relief valves have been made of plastic and are stressed continually by the spring holding them closed. Accordingly, it is possible that a part of the valve stressed by the spring might fracture. In the relief valve disclosed in the aforementioned U.S. Pat. No. 3,807,561, if either one of two legs against which the closure spring bears breaks off, the entire relief valve can travel into the engine.

The present invention avoids the aforementioned problem of the prior art by providing additional legs which are not stressed by the closure spring and thus, in case of breakage of one of the legs that are stressed by the closure spring, prevent entry of the valve member into the engine lubricating system. The legs are also spaced circumferentially about the valve member, and act as a guide when the valve member is installed in the retainer.

This and other advantages of the present invention will become apparent from following description, with reference to the accompanying drawings, in which:

FIG. 1 is an elevational view, partially in cross section of a liquid filter made pursuant to the teachings of the present invention;

FIG. 2 is an enlarged cross-sectional view taken substantially lines 2—2 of FIG. 1; and FIG. 3 is an exploded perspective view of the retainer, spring, and valve member sub assembly used in the liquid filter illustrated in FIGS. 1 and 2.

Referring now to the drawing, a liquid filter generally indicated by the numeral 10 includes a housing 12 defining a cavity 14 therewithin. A conventional filter cartridge generally by the numeral 16 is installed within the cavity 14. The filter cartridge 16 consists of a pleated paper filtering media 18 which is arranged circumferentially about a perforated centertube 20. The top edges of the pleats comprising the media 18 are sealed by sealant 22.

A relief valve assembly generally indicated by the numeral 24, which will be described in detail hereinafter, includes a retainer 26 which closes the top of the centertube 20 and which also includes spring arms 28 which engage the closed end of the housing 12 and yieldably urge the cartridge 16 downwardly viewing FIG. 1. The lower end of the housing 12, viewing FIG. 1, is closed by a conventional closure member 30, which is provided with circumferentially spaced inlet openings 32 and a threaded outlet opening 34, which threadly engages a conventional mounting stud (not shown) when the filter 10 is installed on an internal combustion engine.

The cartridge 16 and retainer 26 cooperate with the housing 12 to define an inlet chamber 36 which communicates with the inlet openings 32 and an outlet chamber 38, circumscribed by the centertube 20, which is communicated to the outlet opening 34. Accordingly, the liquid filtrate communicated through inlet openings 32 normally passes through the media 18, between inlet chamber 36 and outlet chamber 38. The media 18 removes contaminant particles entrained within the liquid filtrate. The liquid filtrate communicates back into the internal combustion engine upon which the filter 10 is used by traveling through the outlet chamber 38 and the outlet opening 34.

In order to prevent the liquid filtrate from bypassing the filter, the retainer 26 closes the top (viewing FIG. 1) of the chamber 38, and accordingly acts with the media 18 as a part of the interface between the inlet chamber 36 and the outlet chamber 38. However, situations do arise in which it is necessary to bypass the media 18. If the liquid filter 10, for example, is not changed at regular intervals, the media 18 may become plugged, thus causing an undesirably high pressure differential between the inlet chamber 36 and the outlet chamber 38. Since severe engine damage can result if the engine is only briefly prevented from receiving an adequate quantity of lubricating oil, it is necessary to provide the relief valve assembly 24, which opens to permit liquid filtrate to bypass the media when the pressure differential between the chambers 36 and 38 attains a predetermined level.

The relief valve assembly 24 includes the retainer 26, a valve element generally indicated by the numeral 40, and a spring 42. As illustrated, the valve element 40 is manufactured from a plastic material that is 5 capable of flexing to permit the portion of the valve assembly engaging the spring 42 to be forced through the aperture 44 provided in the retainer 26. The valve body 40 consists of a valve disc 46, which is adapted to engage the retainer 26 to close the aperture 44, a first set of spring engaging members consisting of legs 48, 50, and a second set of spring engaging members consisting of legs 52, 54. The legs 48, 50, 52, and 54 are spaced circumferentially about the valve disc 46 and extend through the aperture 44 to engage the spring 42. Accordingly, the spring 42 engages one side of the retainer 26 and the valve disc 46 engages the opposite side of the retainer 26.

The legs 48–54 deflect slightly as they are forced through the aperture 44 and, due to their equal circumferential spacing about the valve disc 46, orient the valve body 40 with respect to the retainer 42. Furthermore, the legs are substantially coaxially with the aperture 44. The legs 48 and 50 terminate in spring engaging members 56, 58 which project generally radially with respect to the aperture 44 from the legs 48, 50, and taper axially towards the valve disc 46 to define barbs which carry spring engaging surfaces 60, 62 which engage the upper coil of spring 42, viewing FIG. 3. Legs 52, 54 also include the projecting portions 64, 66 which define spring engaging surfaces 68, 70.

The axial distance between the valve disc 46 and the spring engaging surfaces 68, 70 on the legs 52, 54 is greater than the axial distance between the valve disc 46 and the spring engaging surfaces 60, 62 on the legs 48 and 50. Accordingly, during normal operation of the relief valve assembly 24, the spring 42 is engaged only with the spring engaging surfaces on the legs 48 and 50. Due to the greater axial length between the valve disc 46 and the spring engaging surfaces 68 and 70, the surfaces 68 and 70 are normally separated from the spring 42, as illustrated in FIG. 2. Accordingly, during normal operation of the relief valve assembly, only the legs 48 and 50 are stressed by the spring 42, while the legs 52 and 54 remain unstressed.

In prior art devices, which included only two legs, both of which were stressed by the valve closure spring, one of the legs can fail. In case of failure of one of the legs engaging the spring, the entire valve assembly 40 can drop into the outlet chamber 38, where it is forced into the engine by communication of the lubricating oil out of aperture 34. If this happens, catastrophic failure of the engine can result. However, in the present invention, in case of failure of one or both of the legs 48, 50 which bear the force of the spring 42, the legs 52, 54 will prevent the valve 40 from falling through the aperture 44 and blocking the flow of oil to the engine, thus preventing catastrophic engine failure.

I claim:

1. Liquid filter for filtering a liquid filtrate comprising a housing having an inlet and an outlet, filtering media within said housing dividing the latter into an inlet chamber communicated with said inlet and an outlet chamber communicated with said outlet, and a relief valve assembly opening to permit the liquid filtrate to communicate directly from the inlet chamber to the outlet chamber bypassing said filtering media when the pressure differential between the inlet and outlet chambers exceeds a predetermined level, said relief valve assembly including a retainer cooperating with the filtering media to separate the inlet chamber from the outlet chamber, said retainer defining an aperture communicating the inlet chamber with the outlet chamber, a valve member for closing said aperture, and a spring yieldably urging said valve member into a position closing said aperture, said valve member including first and second sets of spring engaging members, each of said spring engaging members carrying spring engaging surfaces, the spring engaging surfaces on one of said sets engaging said spring to hold the latter away from the spring engaging surfaces on the other set, whereby the spring engaging surfaces on said other set engage said spring only upon breakage of said first set of spring engaging members to prevent the valve member from falling away from said retainer.

2. Liquid filter as claimed in claim 1, wherein said valve member includes a valve body for closing said aperture and said spring engaging members are legs projecting from said valve body in a direction generally coaxially with said aperture, said legs including portions projecting radially with respect to said aperture, said legs carrying said spring engaging surfaces.

3. Liquid filter as claimed in claim 2, wherein said valve body engages one side of said retainer and said spring engages the other side of said retainer, said legs passing through said aperture, each of said sets of spring engaging members including two legs, said legs being spaced circumferentially from one another to cooperate with the aperture to orient the valve body with respect to the aperture.

4. Liquid filter as claimed in claim 2, wherein the distance between the valve body and the spring engaging surface of the legs of the other set of spring engaging members is greater than the distance between the valve body and the spring engaging surface of the legs of the one set of spring engaging members.

5. Liquid filter as claimed in claim 4, wherein the spring engaging surface of the legs of the one set of spring engaging members are defined on axially tapering barbs to capture and retain at least a portion of said spring.

6. Liquid filter as claimed in claim 4, wherein said valve body engages one side of said retainer and said spring engages the other side of said retainer, said legs passing through said aperture, each of said sets of spring engaging members including two legs, said legs being spaced circumferentially from one another to cooperate with the aperture to orient the valve body with respect to the aperture.

* * * * *

UNITED STATES PATENT AND TRADEMARK OFFICE
CERTIFICATE OF CORRECTION

PATENT NO. : 4,990,247
DATED : February 5, 1991
INVENTOR(S) : Theodorus Arnoldus Vandenberk It is certified that error appears in the above-identified patent and that said Letters Patent is hereby corrected as shown below:

Column 1, line 4, after "liquid" insert --filter.--

Signed and Sealed this

Twenty-sixth Day of January, 1993

Attest:

STEPHEN G. KUNIN

Attesting Officer          Acting Commissioner of Patents and Trademarks

UNITED STATES PATENT AND TRADEMARK OFFICE
CERTIFICATE OF CORRECTION

PATENT NO.  : 4,990,247
DATED       : February 5, 1991
INVENTOR(S) : Theodorus Arnoldus Vandenberk It is certified that error appears in the above-identified patent and that said Letters Patent is hereby corrected as shown below:

On the Title page

Item [75], Change Assignee from Allied-Signal Inc. to Allied-Signal Automotive of Canada Inc.

Signed and Sealed this

Twenty-third Day of February, 1993

Attest:

STEPHEN G. KUNIN

*Attesting Officer*   *Acting Commissioner of Patents and Trademarks*